Nov. 11, 1958  J. B. COVI  2,859,982
TRAILER HITCH
Filed April 20, 1956  2 Sheets-Sheet 1

John B. Covi
INVENTOR.

BY
Attorneys

Nov. 11, 1958     J. B. COVI     2,859,982
TRAILER HITCH
Filed April 20, 1956     2 Sheets-Sheet 2

John B. Covi
INVENTOR.

BY *[signatures]*
Attorneys

United States Patent Office 2,859,982
Patented Nov. 11, 1958

2,859,982

TRAILER HITCH

John B. Covi, Mount Bethel, N. J.

Application April 20, 1956, Serial No. 579,500

5 Claims. (Cl. 280—502)

This invention relates to improvements in tow bar attachments or similar devices that are designed to be secured to the bumper of an automotive vehicle.

An object of the present invention is to provide an improved tow bar attachment for a motor vehicle bumper, the attachment featuring the improved means of attachment to the bumper, these means being safe and secure and yet very easily attached and detached without drilling or otherwise disturbing the bumper. In this way the tow bar attachment may be separated from the bumper without leaving disfiguring marks thereon.

A further object of the invention is to provide an improvement in a tow bar attachment wherein the attachment has upper and lower clamps that are drawn tightly together, the action which draws the clamps together tightening them onto the bumper.

A further object of the invention is to provide an improved clamp that may be used in conjunction with a second clamp or may be used by itself in order to couple a drawn vehicle to a power vehicle. In this regard the nature of the clamp is to have a jack provided with its longitudinal axis perpendicular to the face of the bumper and carried by a plate whose end is fitted behind the bumper, whereby upon actuation of the jack the plate is very firmly drawn against the bumper.

Another object of the invention is to provide a tow bar attachment with an adapter making it capable of fitting on any standard motor vehicle rear bumper and inasmuch as the adapter compensates for the different dimension and configuration bumpers of different manufacturer's makes of motor vehicles or even different models of the same manufacturer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
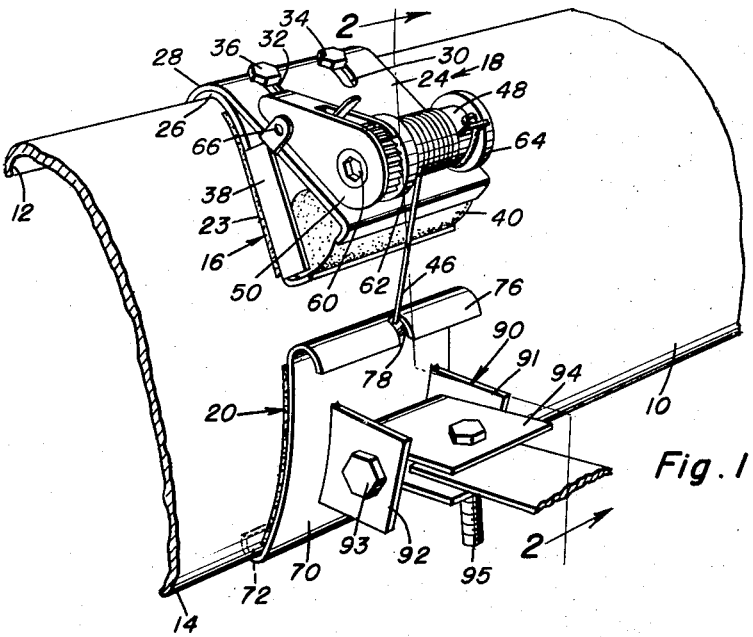
Figure 1 is a perspective view of one form of the invention showing it attached to a standard automotive vehicle bumper.
Figure 2:
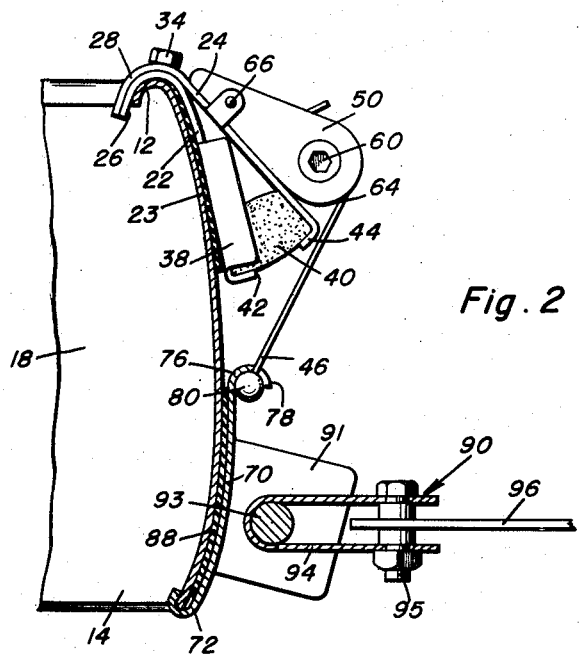
Figure 2 is a sectional view taken approximately on the line 2—2 of Figure 1.

Attention is first invited to Figures 1 and 2 wherein there is an automotive vehicle bumper 10 that typifies the majority of bumpers on most presently available automotive vehicles, such as trucks that have rear bumpers and all automobiles. For rigidity and strength the bumper 10 has a rolled upper edge 12 and is smoothly curved as at 14 along its lower edge. The tow bar attachment 16 comprises an upper clamp 18 and lower clamp 20. The upper clamp consists of a back plate 22 backed by a resilient pad 23 and a front plate 24, these plates being arranged in superposition to each other. The back clamp 22 is adapted to rest on pad 23 against the bumper 10 and has a channel 26 at its upper end that fits over the rolled upper edge 12 of the bumper 10. Plate 24 has a similar channel 28 nested on channel 26. Slots 30 and 32 are formed in the plate 24 so that the bolts 34 and 36 that are threaded in tapped openings in plate 26 may pass therethrough. In this way the plates are relatively movable with respect to each other. In order to constrain the movement of the upper plate with respect to the lower plate, lower plate 22 has sides 38 between which the lateral edges of upper plate 24 are passed. In addition these sides constitute a part of the means for supporting the rubber block 40. Lower wall 42 which rises from the lower edge of plate 22 also partially supports rubber block 40. A similar wall 44 at the lower edge of plate 24 confines the rubber block 40 to the region between the plates 22 and 24. This block functions as means for yieldingly opposing the movement of said plates toward each other. This movement is caused by a flexible element, as cable 46 which is wrapped around drum 48 and attached to clamp 20.

Drum 48 constitutes a part of a winch, the remainder being formed by a ratchet 50 secured to the shaft of drum 48 and mounted on plate 24. The ratchet is of standard construction and is designed to wind the cable 46 on drum 48 or permit the cable to be paid out therefrom. The ratchet and drum shaft 60 is mounted in brackets 62 and 64 that are fixed to the plate 24. A spring finger 66 is secured to plate 24, preferably at an edge thereof and coacts with the ratchet 50 to hold it in the inoperative position (Figure 1) when it is not in use.

Figure 5:
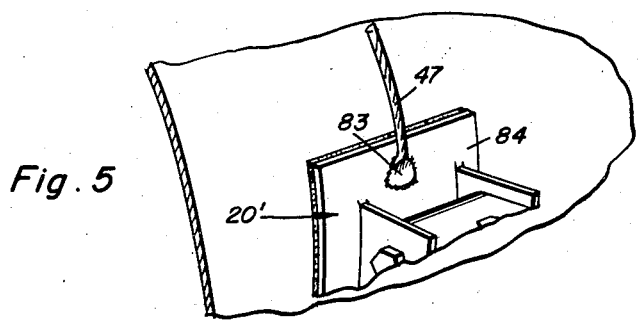
Figure 5 is a fragmentary perspective view of a modified form of the invention.

Clamp 20 consists of a plate 70 which is contoured to fit part of the surface of bumper 10 near the lower edge 14 thereof. A channel 72 is formed at one edge of plate 70 and fits under and behind bumper 10. The upper edge of plate 70 is preferably formed with a downwardly opening channel 76 having a slot 78 in the center thereof. The purpose of the slot is to accept the cable 46 with the ball 80 that is secured to the end thereof being fitted thereunder. This ball fitting in the channel 76 holds the cable securely fastened to the clamp 20. However, in lieu of the detachability involved in using a ball 80 or an equivalent, the cable 46 may be connected to the clamp 20 directly (Figure 5) by being welded as at 83 to plate 84 that constitutes part of the clamp 20'. This is an optional construction which foregoes the feature of having the clamps easily separated from each other when the tow bar attachment is not in use.

Plate 70 is backed by a resilient pad 88 in order to prevent marring the finish of the bumper and also to provide a yielding mount for the clamp. Means consisting of a bracket assembly 90 are attached to and constitute a part of the clamp 20. These means include a pair of parallel brackets 91 and 92 which extend from the front surface of plate 70. A bolt 93 passes through aligned apertures in these brackets 91 and 92 and accommodate a U-shaped plate 94 whose outer extremity has a coupling bolt 95 connected with it. This coupling bolt is adapted to attach to a draw bar 96 or an equivalent (Figure 2).

In use, the tow bar attachment is assembled on the rear bumper of a motor vehicle as shown in Figure 1. By tightening the ratchet 50 the cable 46 is drawn taut with the yielding pad 40 compressing slightly. This firmly attaches the tow bar attachment to the bumper so that it is ready for use in a safe and secure manner.

Figure 6:
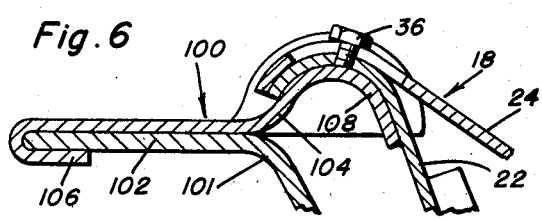
Figure 6 is an enlarged fragmentary sectional view of the adapter which is to be used in connection with certain automotive vehicle bumpers.

In instances wherein there is not enough room for the upper clamp to fit on the bumper, an adapter 100 (Figure 6) is used. Here, the bumper 101 has a horizontal upper flange 102 which extends rearwardly that is toward the deck of the motor vehicle to which it is attached. Accordingly, clamp 18 is fitted over the upper part of adapter plate 104 and is held in place by tightening cable 46 on drum 48 as previously described. Adapter plate 100 has a channel 106 at one end which is fitted over the rear edge of the bumper 101 and has a raised part 108 near the front edge thereof on which the clamp 18 is rested. When other types of bumpers are involved, the shape of adapter plate 104 may have to be altered slightly to conform to its particular shape. In other instances it may be that the upper clamp 18 would be connected to the grille or deck guard rail with the lower clamp attached to the lower edge of the bumper.

Figure 3:
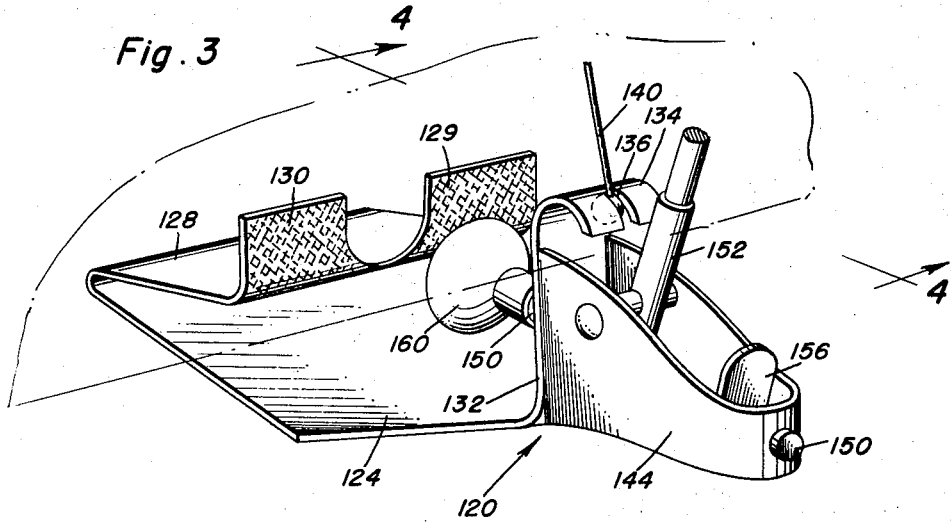
Figure 3 is a perspective view of another form of the invention.
Figure 4:
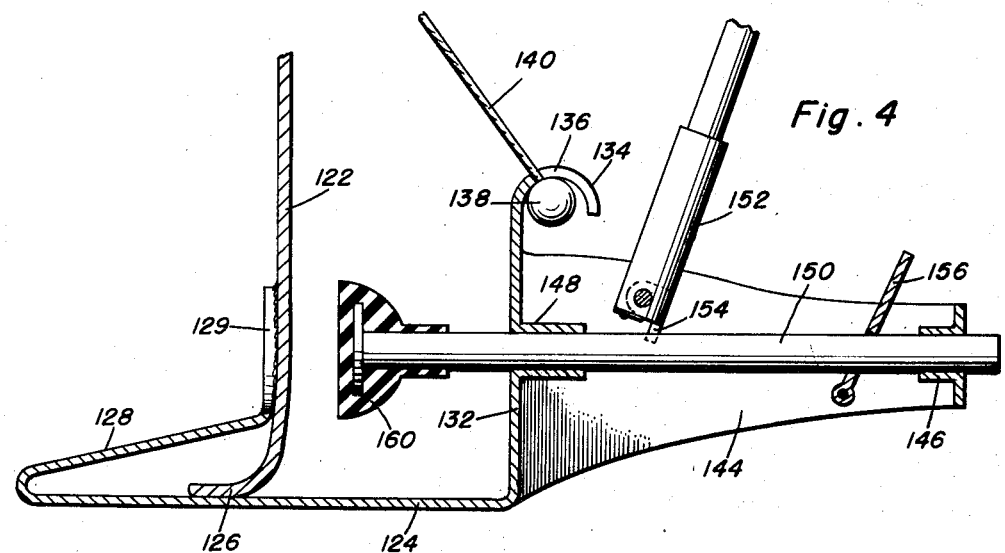
Figure 4 is a longitudinal sectional view taken on the line 4—4 of Figure 3.

Attention is now invited to Figures 3 and 4. Here a clamp 20 is shown attached to a bumper 122 of a motor vehicle. This clamp may be used alone, that is without an additional clamp or, it may take the place of clamp 20 in Figure 1. These are two options for the use of clamp 120 in the tow bar attachment. The clamp comprises a plate of approximately U-shaped form and having a lower flat part 124 that fits under the lower edge 126 of bumper 122. A return wall 128 extends forwardly of the plate 124 and is joined integrally therewith at the rear edge thereof. Seats 129 and 130 are formed as vertical continuations of the returned wall 128 and are covered with rubber or other friction enhancing material. They are adapted to bear against the rear surface of bumper 122 as shown in Figure 4.

A vertical plate 132 rises from the front edge of the flat part 124 and has a downwardly opening channel 134 at its upper edge. This channel has a slot 136 in it in order to accommodate the ball 138 at the end of cable 140. This ball and cable are identical in construction and function to the ball 80 and cable 46 of Figure 1. A frame 144 is fixed to the front face of wall 132 and has a bushing 146 in alignment with a frontal opening therein. Another bushing 148 is in alignment with an opening in the wall 132, these bushings accommodating rod 150 that constitutes a part of a jack. The jack may assume several forms, the simplest being the friction jack comprising a pusher lever 152 having a pawl 154 at its lower end, together with a locking collar 156 that frictionally engages the surface of rod 150. Resilient pad 160 is on the inner end of rod 150 and is adapted to bear upon the outer surface of the bumper 122 when the jack is actuated in such a manner as to move rod 150 toward the bumper. To release the jack the clutch member 156 is released from engagement with the surface of rod 150.

In use this form of the invention will be coupled with clamp 16 or one very similar to it. Alternatively it will be used alone. In either case the frame 144 provides means to which a drawn wagon or other vehicle or implement may be attached.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a tow bar attachment for a motor vehicle bumper, a clamp comprising a support that has a seat which bears against the rear surface of the bumper, a lower plate extending below the lower edge of said bumper, an upstanding wall connected to said plate, a jack, a frame secured to said wall, said frame and said wall having aligned apertures therein, said jack including a rod which is slidable in said aligned apertures in order to bear against the front surface of the bumper, a pad of yielding material on said rod which is adapted to contact the front surface of the bumper, bushings secured to said wall and said frame respectively through which said rod passes in order to guide said rod, said wall having a channel therein, said channel being provided with a slot in order to accommodate an enlargement, a flexible member having the enlargement at the end thereof, and means carried by the same bumper and having said flexible member connected with it in order to aid in firmly engaging said clamp to the bumper.

2. In a tow bar attachment for a motor vehicle bumper, a clamp comprising a support that has a seat which bears against the rear surface of the bumper, a lower plate extending below the lower edge of said bumper, a vertically rising wall connected to said plate, a jack, a frame secured to said wall, said frame and said wall having aligned apertures therein, said jack including a rod which is slidable in said aligned apertures in order to bear against the front surface of the bumper, a pad of yielding material on said rod which is adapted to contact the front surface of the bumper, bushings secured to said wall and said frame respectively through which said rod passes in order to guide said rod, said wall having a channel therein, said channel being provided with a slot in order to accommodate an enlargement, a flexible member having the enlargement at the end thereof, and means carried by the same bumper and having said flexible member connected with it in order to aid in firmly engaging said clamp to the bumper, the last mentioned means comprising a clamp, a drum carried by said clamp, said flexible member being secured to said drum, ratchet means to actuate said drum and carried by said second clamp.

3. The combination of claim 2 wherein said second clamp includes a pair of plates which are movable with respect to each other, means for attaching said plates to the bumper, said drum being carried by one of said pair of plates, and yielding means interposed between said pair of plates to yieldingly oppose the movement of said pair of plates in one direction.

4. The combination of claim 3 wherein said means for attaching said plates to the upper edge of the bumper includes an adapter which is secured to said pair of plates and which has a channel at one end adapted to fit over an edge of the bumper.

5. The combination of claim 4 wherein said yielding means consists of a pad of rubber.

References Cited in the file of this patent

UNITED STATES PATENTS

| | | |
|---|---|---|
| 2,429,544 | Bennett | Oct. 21, 1944 |
| 2,432,249 | Pearson | Dec. 9, 1947 |
| 2,506,109 | Riemann et al. | May 2, 1950 |
| 2,542,907 | Dayton et al. | Feb. 20, 1951 |
| 2,569,843 | Adler et al. | Oct. 2, 1951 |
| 2,575,596 | Rettinger | Nov. 20, 1951 |
| 2,642,295 | Riemann | June 16, 1953 |
| 2,668,064 | Bolling | Feb. 2, 1954 |
| 2,673,095 | Fulton | Mar. 23, 1954 |
| 2,726,880 | Klein | Dec. 13, 1955 |
| 2,747,893 | Straud | May 29, 1956 |